(12) United States Patent
Farber (10) Patent No.: US 10,837,940 B1
(45) Date of Patent: Nov. 17, 2020

(54) PLANAR SENSOR DESIGN AND PULSE DISCHARGE TECHNIQUE HARDWARE

(71) Applicant: Boris Farber, Solon, OH (US)

(72) Inventor: Boris Farber, Solon, OH (US)

(73) Assignee: BJR SENSORS LLC, Solon, OH (US)

( * ) Notice: Subject to any disclaimer, the term of this patent is extended or adjusted under 35 U.S.C. 154(b) by 0 days.

(21) Appl. No.: 15/817,174

(22) Filed: Nov. 18, 2017

(51) Int. Cl.
*G01N 27/407* (2006.01)
*G01N 27/416* (2006.01)
*G01N 27/30* (2006.01)

(52) U.S. Cl.
CPC ....... *G01N 27/4162* (2013.01); *G01N 27/304* (2013.01); *G01N 27/4073* (2013.01); *G01N 27/4075* (2013.01)

(58) Field of Classification Search
CPC ............... G01N 27/407; G01N 27/4071–4075
See application file for complete search history.

(56) References Cited

U.S. PATENT DOCUMENTS

2015/0013431 A1* 1/2015 Kakimoto ............ G01N 27/419
73/23.31

\* cited by examiner

*Primary Examiner* — Alexander S Noguerola
(74) *Attorney, Agent, or Firm* — Gugliotta & Gugliotta, LPA (57) ABSTRACT

An improvement in the method or technique of conditioning a gas sensor is provided through the application of Pulse Discharge Technique (PDT) in order to condition mixed-potential gas sensors. A modified planar sensor design to minimize sodium atom diffusion and platinum electrode poisoning under conditions of PDT are provided. Modification of the PDT hardware is provided without modification of the sensor design. The improvement method comprises:
  a) Replace a single polarity power supply with a power supply with floating positive and negative output;
  b) Connect one of the heater leads with the reference electrode lead and connect it to the ground.

14 Claims, 13 Drawing Sheets

FIGURE 1 Prior art design of a planar O2 sensor

FIG 3. Improved prior art design of a planar O2 sensor

FIGURE 2 Prior Art design of a thimble Oxygen sensor

FIG 4. PRIOR ART PDT hardware schematics.

FIG. 5 Modified Hardware

FIGURE 6 NOx sensor response under conditions of PDT for modified hardware (see FIG. 5) versus prior art (see FIG. 4).

FIG 7. Suggested design modification.

FIGURE 8. Suggested possible design modification in greater details

FIGURE 9. Suggested design modification in the thimble cell.

FIGURE 10. Additionally modified hardware with additional reference electrode

FIGURE 11. Measurement data for the sensor design shown in FIG. 9

FIGURE 12. Measured 3 electrode sensor response to varying O2 concentrations

FIGURE 13. Calibration Curve

FIGURE 14. Measured versus applied O₂%

US 10,837,940 B1

PLANAR SENSOR DESIGN AND PULSE DISCHARGE TECHNIQUE HARDWARE

RELATED APPLICATIONS

The present invention claims the benefit of U.S. Provisional Application No. 62/425,126, filed on Nov. 22, 2016 and incorporated by reference as if fully rewritten herein.

BACKGROUND OF THE INVENTION

1. Field of the Invention

The present invention relates generally to an improvement in the present inventor's method or technique, as claimed in the related art, of conditioning a gas sensor through the application of pulse discharges in order to condition mixed-potential gas sensors.

2. Description of the Related Art

Figure 1:
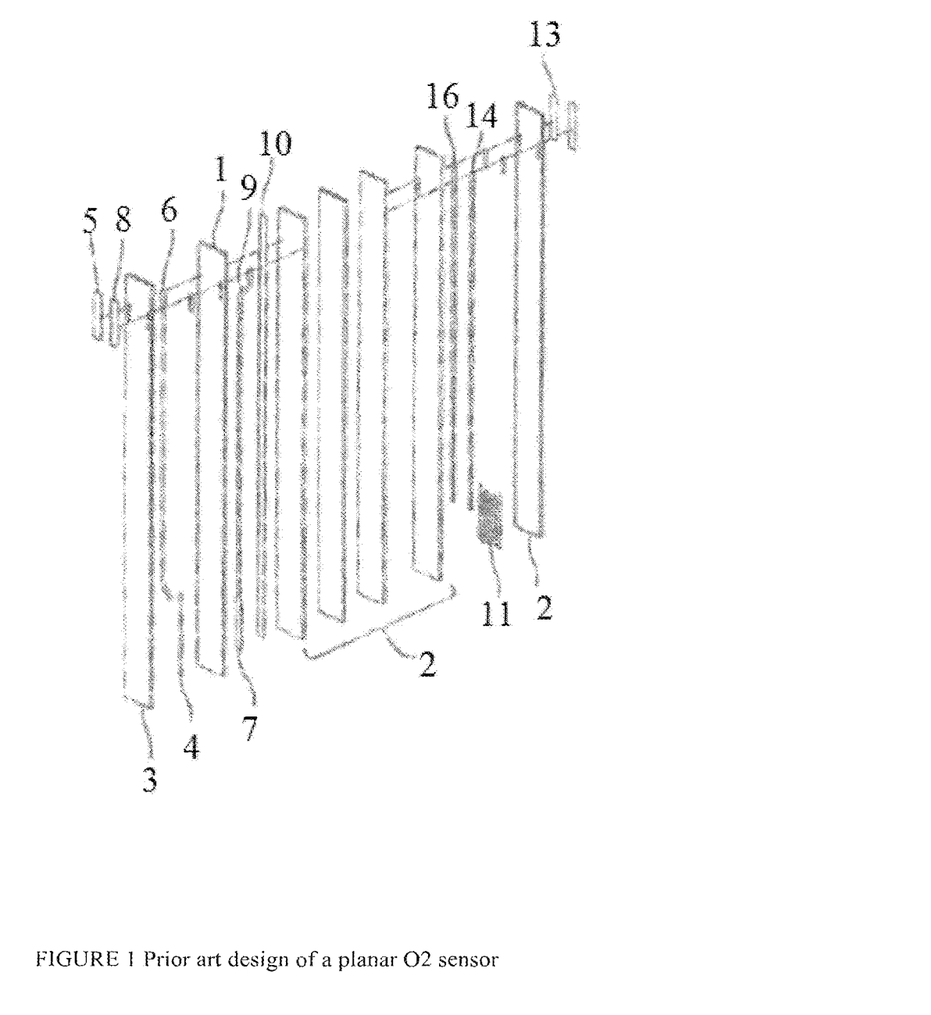
FIG. 1 depicts a perspective view for a design of a planar type sensor according to the PRIOR ART.
Figure 2:
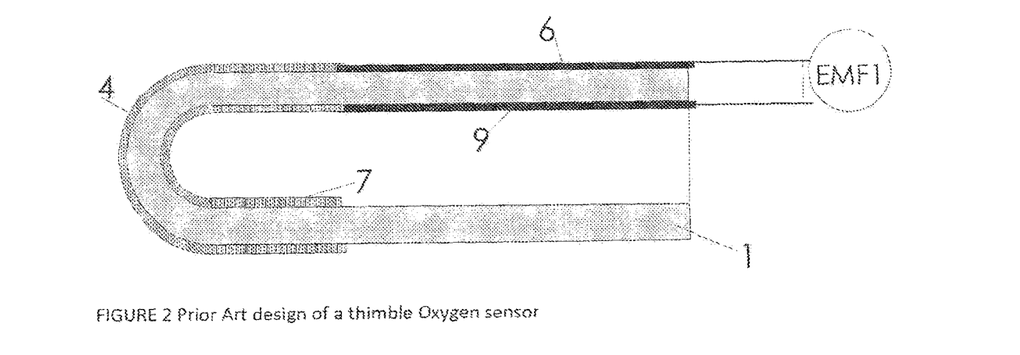
FIG. 2 depicts a perspective view for a design of a thimble type sensor according to the PRIOR ART.
Figure 3:
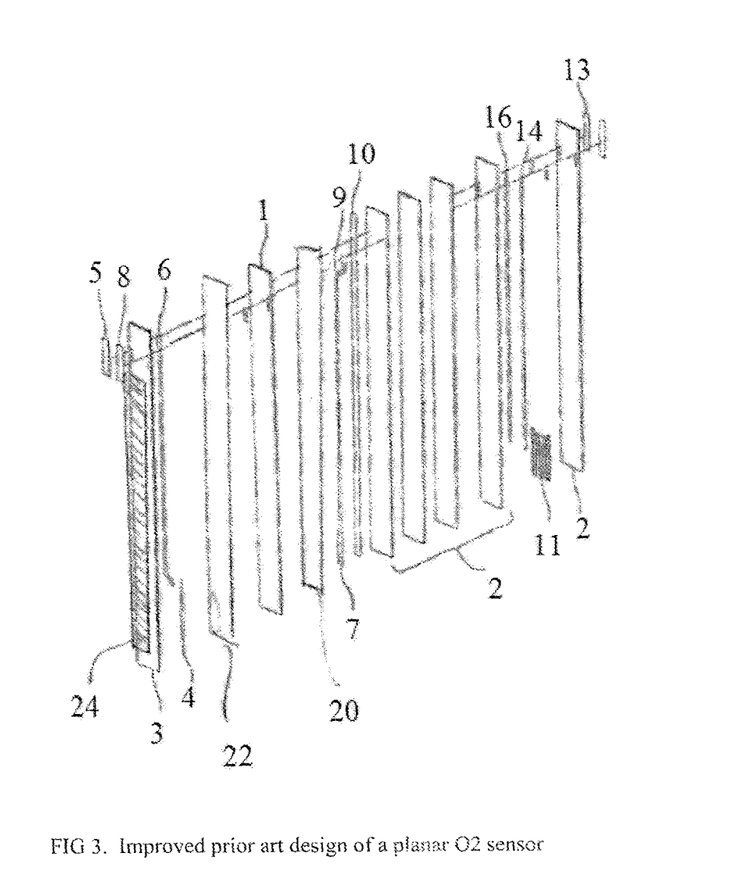
FIG. 3 is a perspective view of an improved planar type sensor according to the preferred embodiment of the present invention.

A typical current design of a planar type sensor is shown in FIG. 1 and a thimble type sensor in FIG. 2 according to the PRIOR ART. To make such a sensor design more suitable for utilization with the Pulse Discharge Technique (PDT), suggested design improvements, as shown in FIG. 3 for a planar type sensor, were described and taught in the Related Applications, and especially in Provisional Application 62/318,245 (currently abandoned). However, a remaining deficiency which still needs to be addressed is related to degradation of the reference Pt electrode 7 (in FIGS. 1 and 3) due to sodium atom (Na) poisoning of the catalytic activity. Sodium atoms are reaching the Pt electrode via electro-diffusion through the $Al_2O_3$ substrate layers (2) under the influence of electric field generated by the cross-layer potential formed between the Pt heater (11) and the Pt electrode (7).

The additional limitation of the PDT in the Prior Art approach is related to inability to measure oxygen concentration due to low temperature sensor operational range (T<500° C.) suitable for NOx detection. Accurate and concurrent $O_2$ and NOx measurements were not possible.

Figure 4:
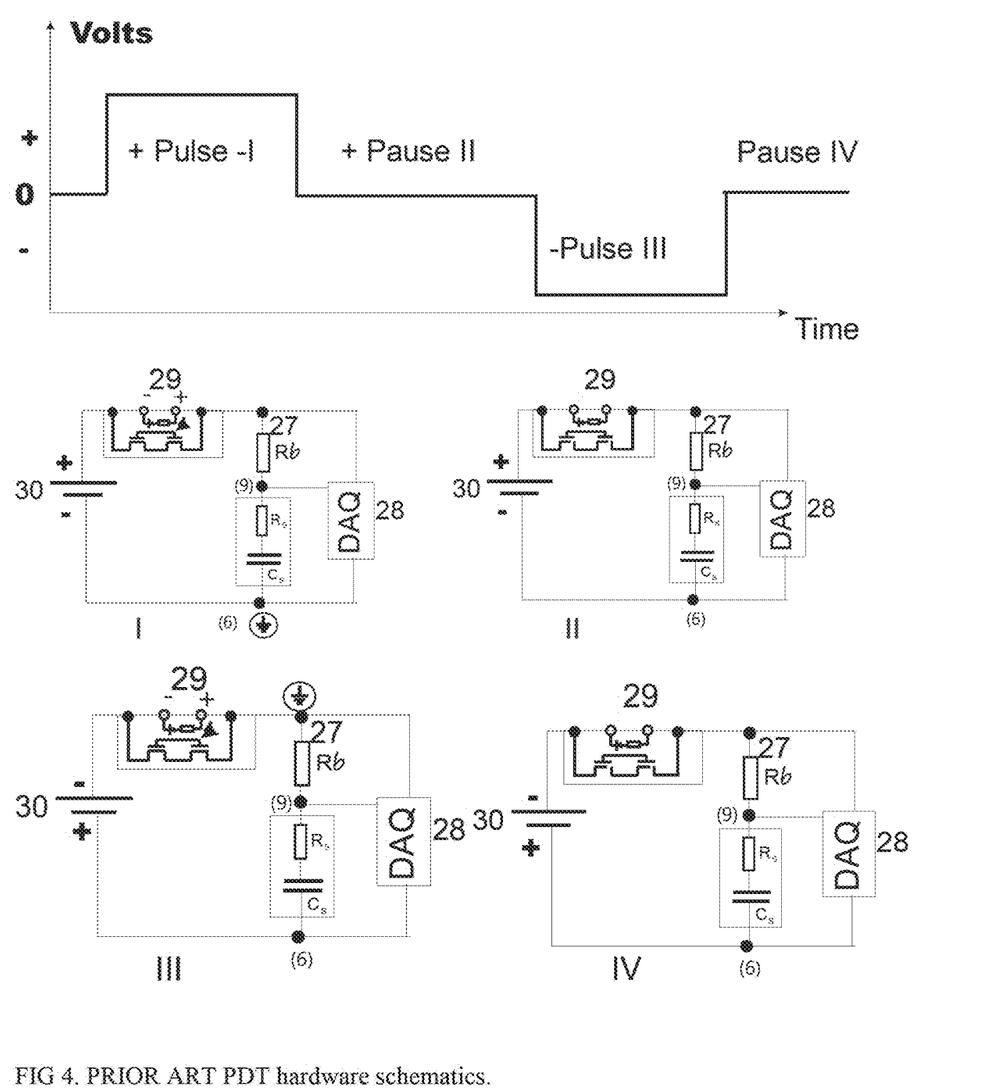
FIG. 4 are electrical schematics depicting the four (4) steps of the Pulse Discharge Technique applied to a sensor according the Related Art.

The Prior Art solution (see U.S. Pat. No. 8,053,706) for reduction of electrode poisoning is to eliminate cross-layer potential by connecting the heater lead (16) with the Pt electrode lead (9). This approach cannot be directly used with the Pulse Discharge Technique (PDT) of the Related Art, in its present form, since it will interfere with the sensor charging during negative and positive pulses. (Negative lead of the power supply is grounded, see FIG. 4). It will also interfere with the open circuit discharge of the charged sensor electrodes.

It is thus an object of the present invention to provide an improvement in the present inventor's method or technique, as claimed in the related art, of conditioning a gas sensor through the application of pulse discharges in order to condition mixed-potential gas sensors.

It is still a further object of the present invention to provide a method of preventing denigration of a sensor reference electrode.

It is still a further object of the present invention to provide a method for concurrent measurements of $O_2$ and other gases typically found in a combustion exhaust.

SUMMARY OF THE INVENTION

Figure 5:
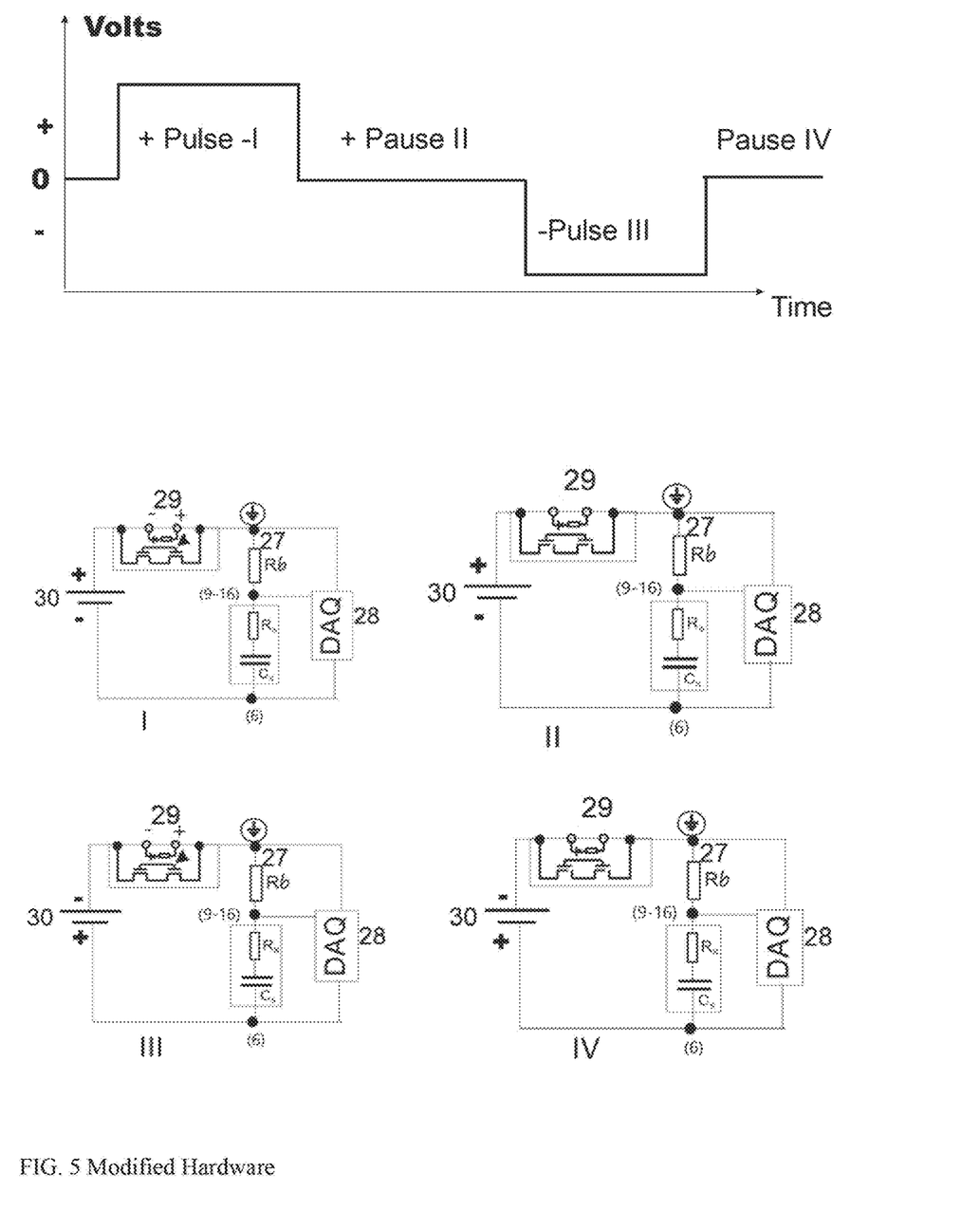
FIG. 5 is an electrical schematic of the modified hardware for the improved planar type sensor according to the first alternative of the preferred embodiment of the present invention.

Briefly according to the present invention, modifications to the PDT hardware and to the planar sensor design to minimize Na atom diffusion and Pt electrode poisoning under conditions of PDT are provided. Modification of the PDT hardware without modification of the sensor design. The improvement method comprises (see FIG. 5):

a) Replace single polarity power supply with a power supply equipped with floating positive and negative outputs;

b) Connect one of the heater leads (16) with the reference electrode lead (9) and connect it to the ground.

Such modifications in the PDT hardware will eliminate the cross-layer potential, which will result in reduced Na atoms diffusion and electrode poisoning. Modification of the planar or thimble-type oxygen sensor design is suggested by depositing additional reference electrode (exposed to ambient air), which is electrically isolated from the original reference electrode. During the charging phases of the PDT measure the differential signal between the measurement electrode and the grounded original reference electrode and the measurement electrode and the electrically isolated additional reference electrode.

Establish calibration curve relating differential signal with known applied oxygen concentration and using this calibration curve for accurate measurements of the oxygen concentration in the analyzed gas.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The best mode for carrying out the invention is presented in terms of its preferred embodiment, herein depicted within the Figures.

1. Detailed Description of the Figures

According to the preferred embodiment of the present invention, in order to make a planar gas sensor design more suitable for utilization with the Pulse Discharge Technique (PDT), suggested design improvements, as shown in FIG. 3, are provided. Modification of the PDT hardware may occur without modification of the sensor design. In such an aspect of the present invention, the sensor is improved through a method comprising:

a) Replacing a single polarity power supply with a power supply with floating positive and negative outputs;

b) Connecting one of the heater leads (16) with the reference electrode lead (9) and connect it to the ground via balance resistance Rb (see FIG. 5); and c) Appling positive and negative polarity pulses between the sensor electrodes during the charging phases of PDT (I and Ill)

d) Disconnecting from the power supply and observe the open circuit sensor discharge during the pauses (stages II and IV).

Figure 6:
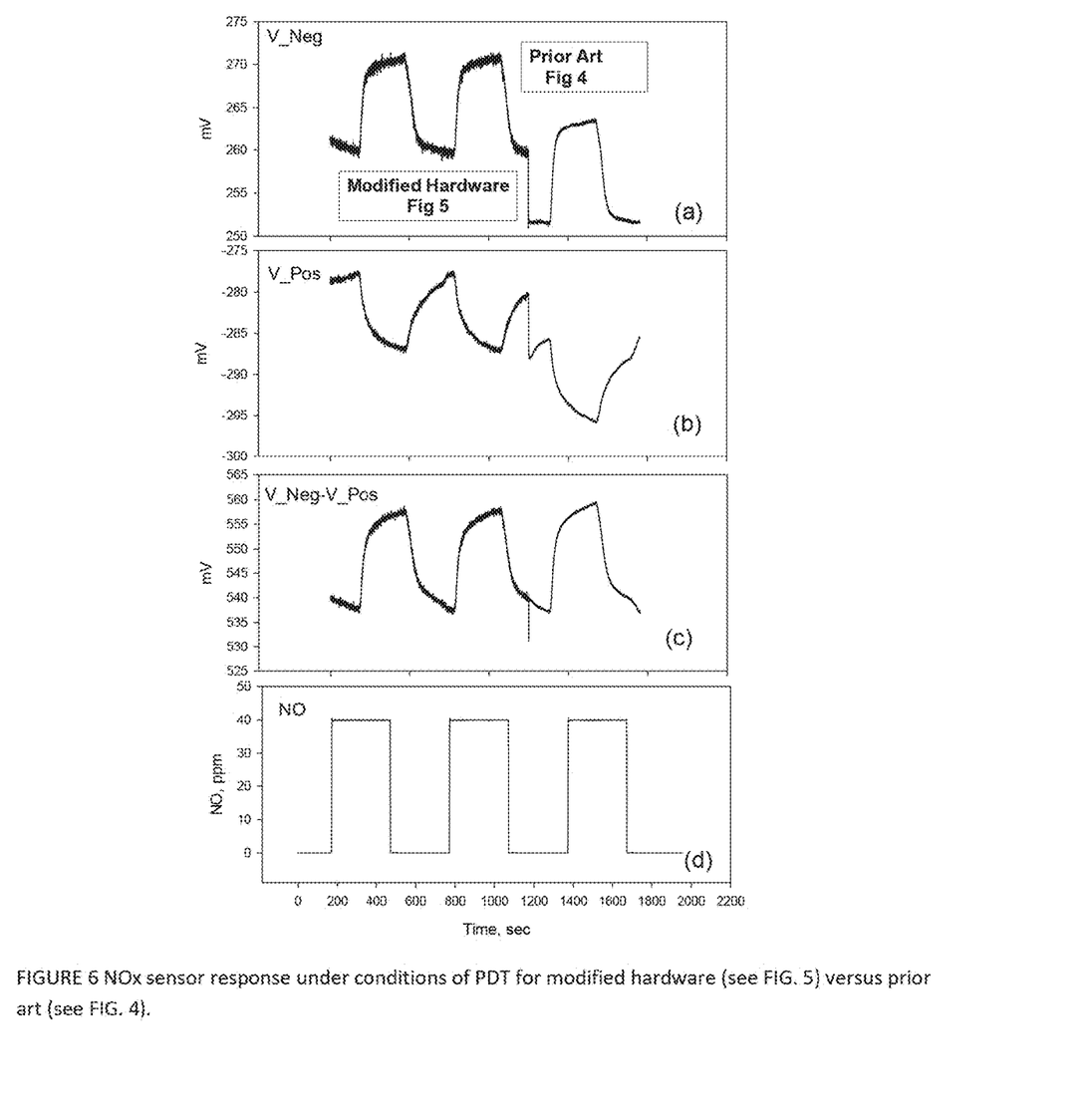
FIG. 6 is a sensor response to varying concentrations of nitric oxide (0-40 ppm) in accordance with a prior art and new modified PDT hardware. Test conditions ($O_2$=10%, T=400° C., $H_2O$=10%, $CO_2$=12%)

Such modifications in the PDT hardware will eliminate the cross-layer potential during the charging pulses, which will result in reduced Na atoms diffusion and electrode poisoning. FIG. 6 demonstrates that these suggested modifications of the PDT hardware don't have negative impact on the NOx measurement sensitivity. Sensor response is the same for the modified hardware as compared with the PRIOR ART.

Figure 7:
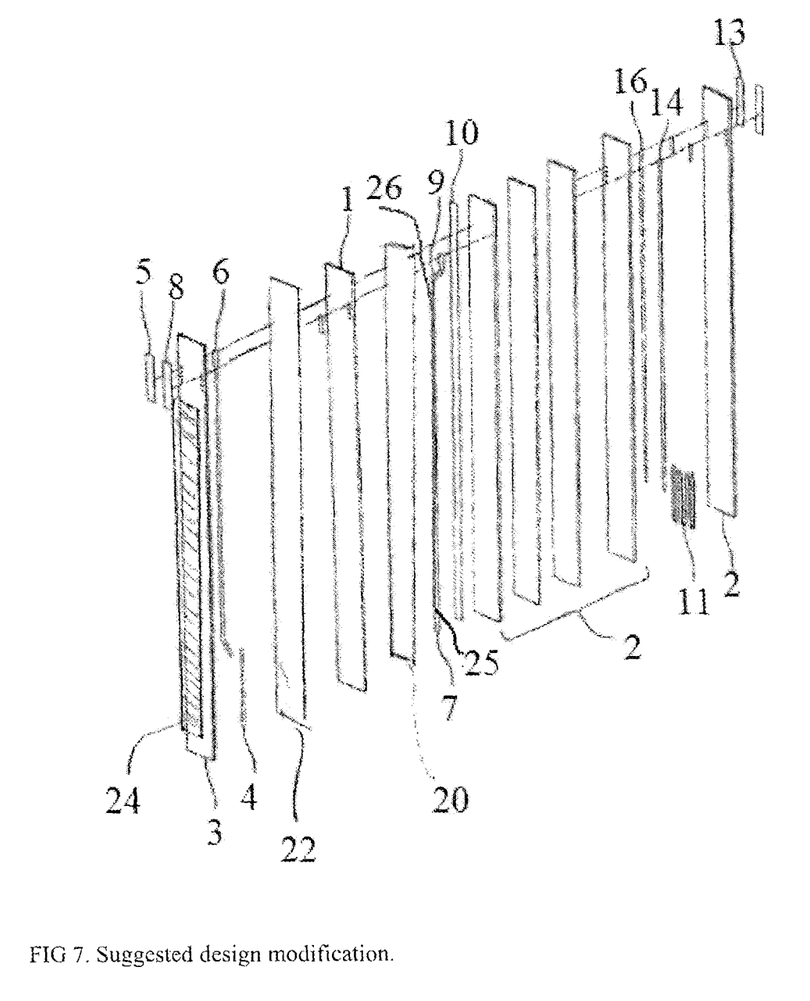
FIG. 7 is a schematic view of an improved planar type sensor according to a second alternate embodiment of the present invention.
Figure 8:
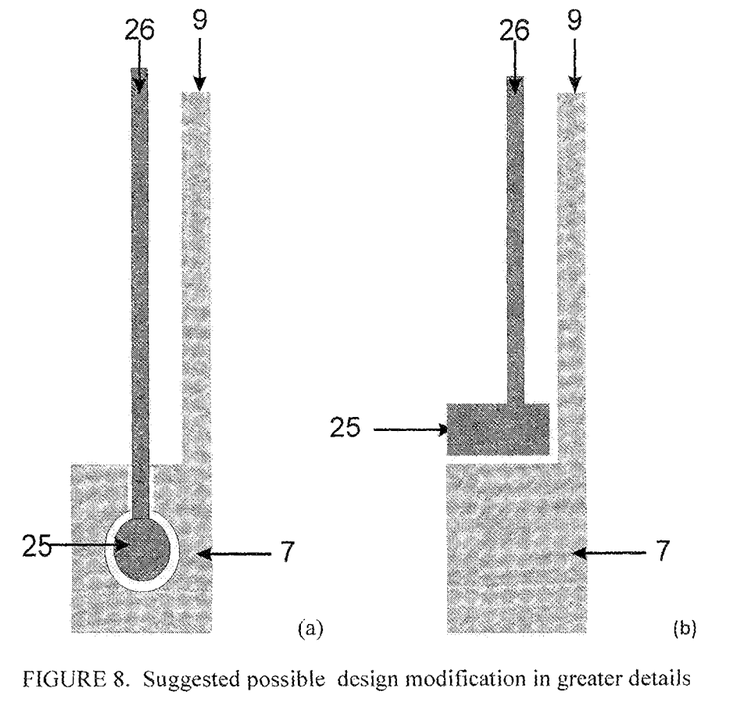
FIG. 8 is an exploded perspective view of an improved planar type sensor according to a second alternate embodiment of the present invention.

Additional improvements, related to concurrent measurements of oxygen and NOx concentrations under the PDT conditions can be achieved with modifications to the sensor design. According to such an aspect of the invention additional reference electrodes may be included. As shown in conjunction with FIG. 7, for a planar sensor an additional reference Pt electrode 25 may be deposited inside the original reference Pt electrode (7) such that the two electrodes are electrically isolated. As further shown in conjunction with FIG. 8, the additional reference electrode 25 can be deposited either inside the original reference electrode (7) or in immediate vicinity to the original reference electrode.

Figure 9:
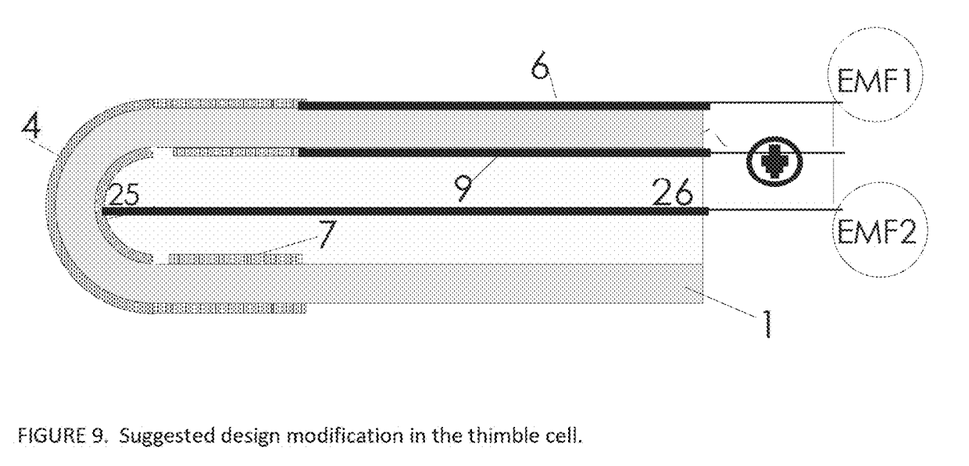
FIG. 9 is a schematic view of an improved thimble type sensor according to a second alternate embodiment of the present invention.

Analogous modifications of the sensor design can be implemented in case of a thimble sensor as shown in FIG. 9.

Figure 10:
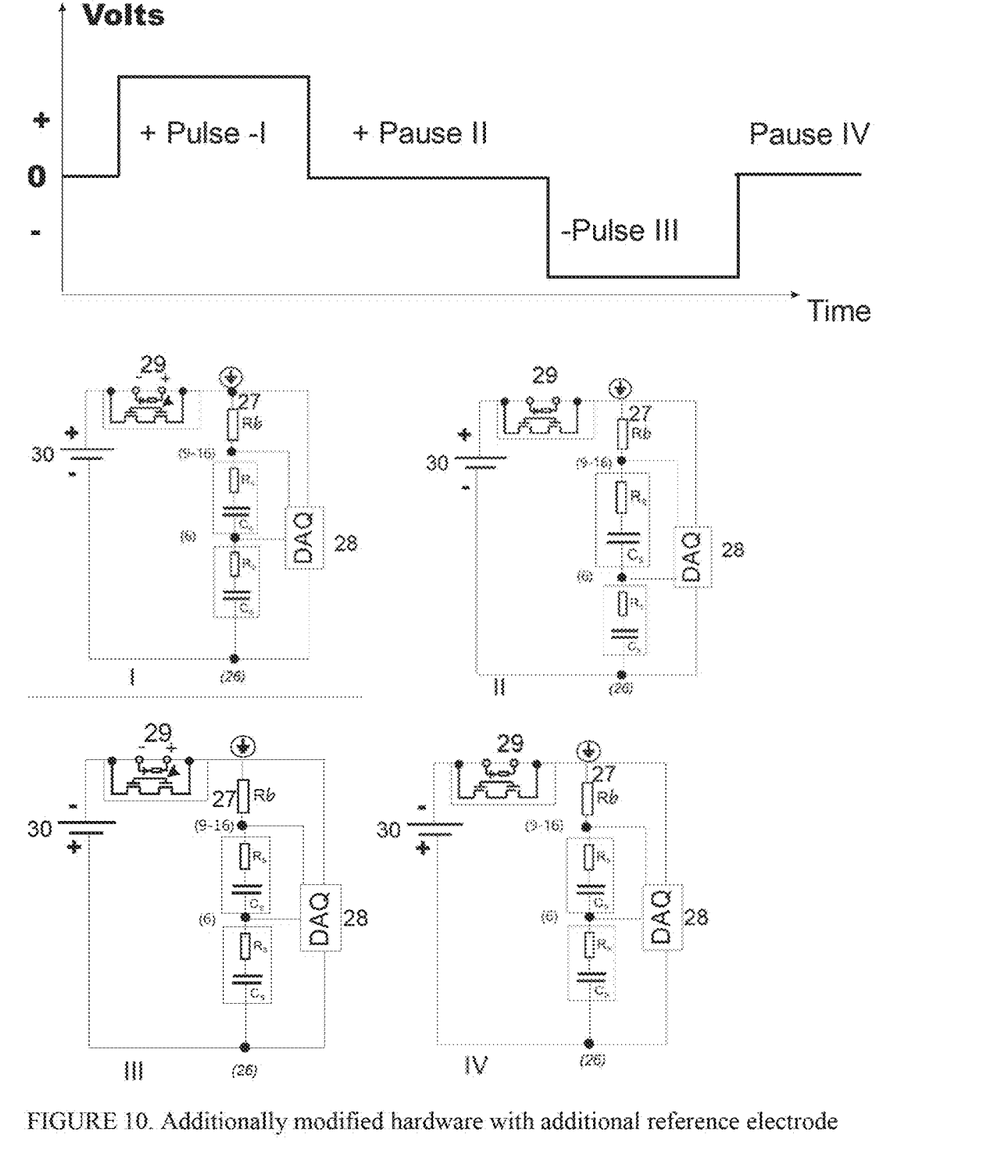
FIG. 10 is electrical schematics depicting the four (4) steps of the Pulse Discharge Technique applied to a sensor according the second alternate embodiment of the present invention.

Yet another configuration of the present invention may be described according to the modified PDT hardware as shown in FIG. 10. Original reference electrode (7) is permanently connected to the Pt heater lead (16) by connecting leads (9) and (16). During all stages of the PDT, voltage drop is measured on the balance resistor (27), between the original reference electrode and the measurement electrode (between leads 6 and 9), and between additional reference electrode and the ground (lead 26 and the ground).

Figure 11:
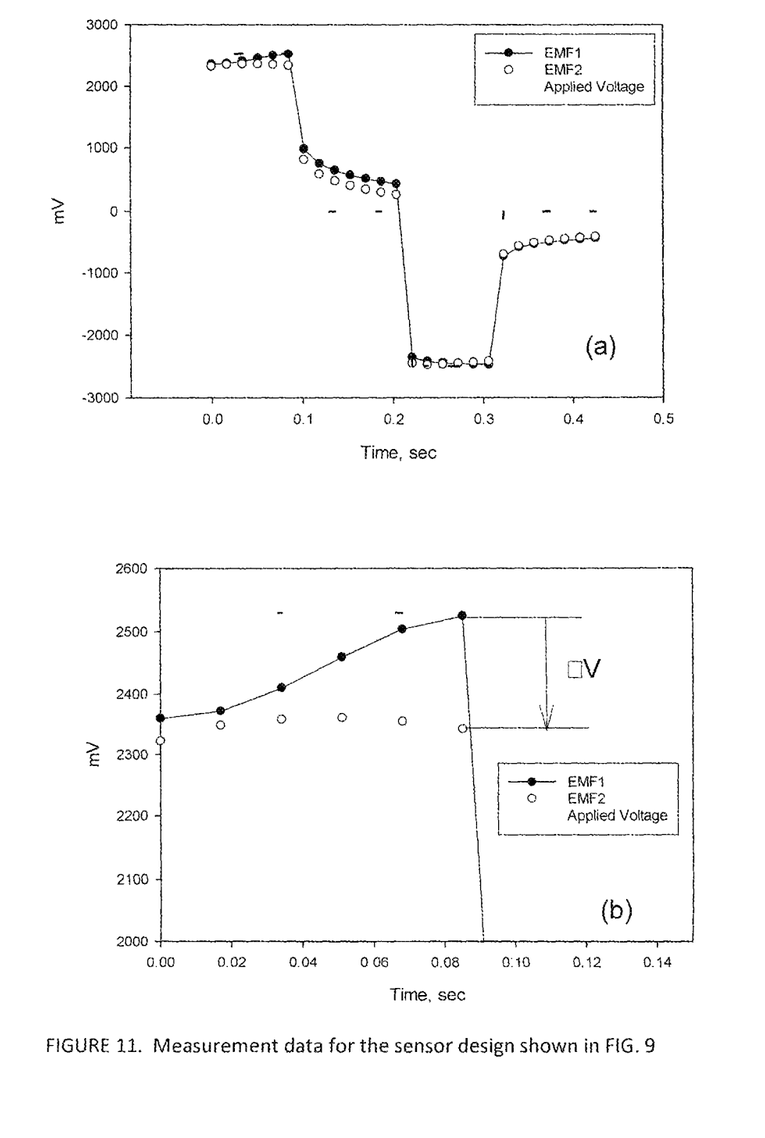
FIG. 11 an example of the measurement data and schematic of measurements obtained on a modified thimble type sensor in accordance with preferred embodiment of the current invention. Test conditions: $O_2$=15%, T=350° C., $H_2O$=10%, $CO_2$=12%.

FIG. 11 shows an example of these types of measurements. In FIGS. 11a and b shows the applied charging pulse from the power supply, EMF1 differential voltage between the original reference electrode and the measurement electrode and EMF2 between the ground and the additional reference electrode. FIG. 11b shows a schematic suitable for measurements of the oxygen concentration. Differential voltage is determined at the end of the charging voltage cycle when the positive voltage is applied to the external (measurement) electrode ($\Delta V$).

Figure 12:
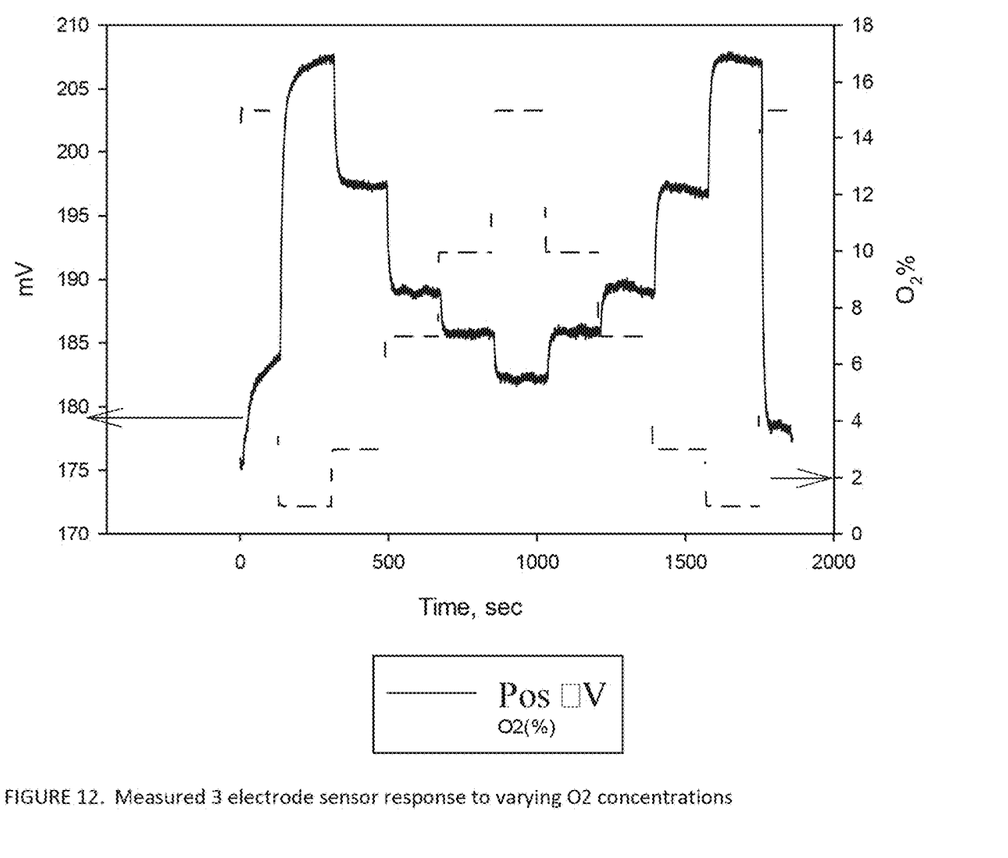
FIG. 12 Modified thimble sensor response to varying concentration of oxygen from 1 to 15%; Test conditions: T=350° C., $H_2O$=10%, $CO_2$=12%.
Figure 13:
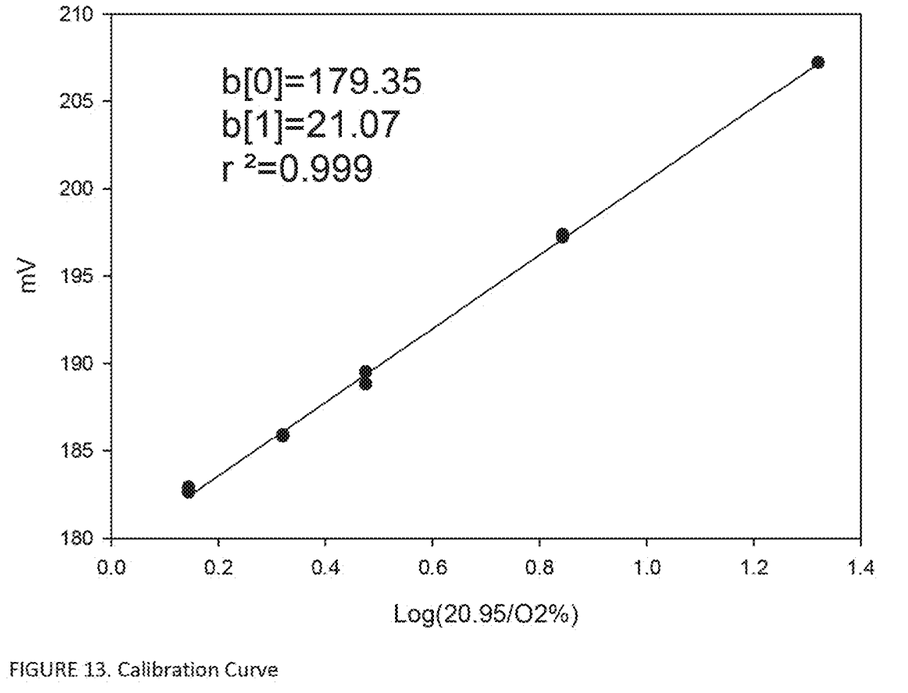
FIG. 13 Calibration curve for oxygen concentration measurements.

FIG. 12 shows variation in as measured $\Delta V$ in response to known varying concentrations of oxygen in the range of 1-15%. FIG. 13 shows a calibration curve relating as measured $\Delta V$ with the oxygen concentrations in semi-logarithmic coordinates.

Figure 14:
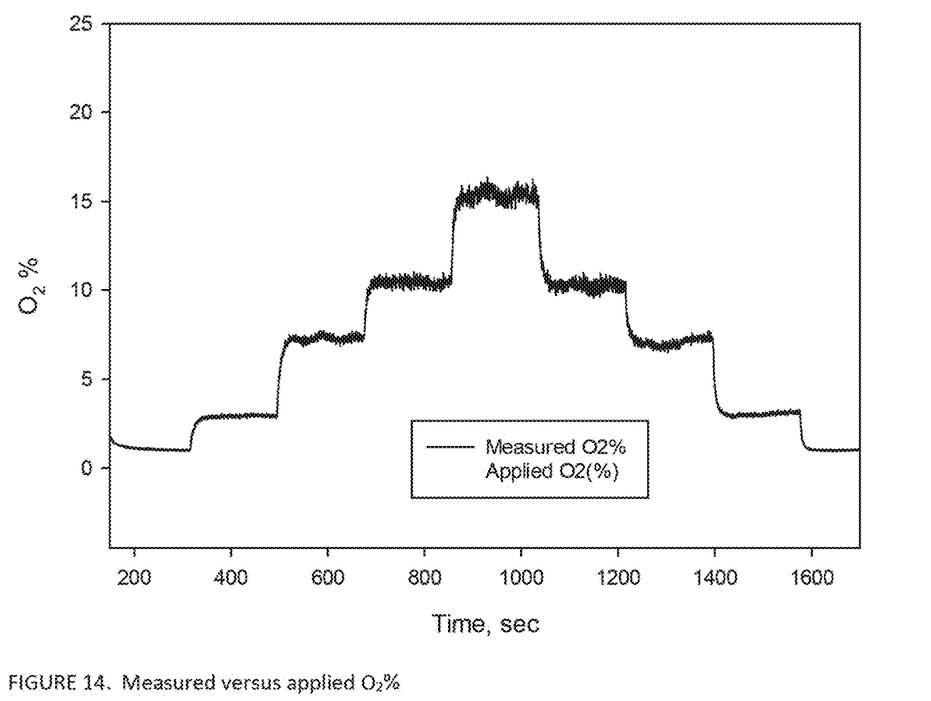
FIG. 14 Measured versus applied oxygen concentration under conditions of PDT.

By utilizing as established calibration curve, oxygen concentrations can be accurately determined as shown in FIG. 14 in close agreement with the applied oxygen concentrations.

2. Operation of the Preferred Embodiment

In operation, the present solution will offer permanent reduction of the cross alumina layer potential and will reduce electro-diffusion of Na atoms and poisoning of the sensor electrodes and will allow concurrent measurements of $O_2$, $NO_x$ and $NH_3$ under conditions of the Pulse Discharge Technique.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 US 17 (1997) or *Festo Corp.* v. *Shoketsu Kinzoku Kogyo Kabushiki Co.*, 535 U.S. 722 (2002), or other similar case-law or subsequent precedent should not be made if any future claims are added or amended subsequent to this Patent Application.

What is claimed is:

1. A gas sensor comprising:
   a solid electrolyte layer of yttria stabilized zirconia (YSZ) sandwiched between exhaust gas sensing electrodes and reference electrodes and layered with a layer of alumina and a layer of mixed alumina-zirconia;
   an additional $NO_x$ and $NH_3$ sensitive composite layer of Pt and YSZ having a Pt fraction of approximately between around 10% by volume to around 25% by volume and sandwiched between the layer of YSZ and the exhaust gas sensing and reference electrodes;
   a layer of porous $MgAl_2O_4$ covering the exhaust gas sensing electrode exposed to analyzed gas;
   the exhaust gas sensing electrode under the porous $MgAl_2O_4$ layer which connects to a contact pad through a lead; and
   a reference electrode connecting to the pad through a lead and disposed in fluid communication with a reference chamber exposed to an ambient atmosphere.

2. The gas sensor of claim 1, wherein said mixed layer of porous $MgAl_2O_4$ is between approximately 100 mm thick to approximately 200 mm thick.

3. In the gas sensor of claim 1, wherein said YSZ—Pt layer has thickness between approximately 10 μm to approximately 20 μm.

4. In the gas sensor of claim 1, wherein said YSZ—Pt layer comprises a paste of YSZ with dispersed Pt particles.

5. The gas sensor of claim 1 wherein said exhaust gas sensing and reference electrodes comprise platinum.

6. A method for finding optimum operational conditions for concurrent measurements of $NO_x$ and $NH_3$ for a gas sensor of claim 1 comprising:
   a. measuring sensor responses at different operating temperatures; and
   b. selecting an operating temperature resulting in increases in sensor responses by absolute values in response to $NO_x$ injection in an analyzed gas stream.

7. A gas sensor of claim 1 treated to minimize Na atom diffusion and Pt electrode poisoning by a method comprising:
   a) replacing a single polarity power supply with a power supply with floating positive and negative outputs;
   b) permanently connecting a heater lead with a lead of a reference electrode and connecting the heater lead to ground;
   c) charging pulses by connecting a sensing electrode to a charging power supply; and
   d) pausing the pulses during charging by disconnecting the electrodes from the charging power supply and observe the open circuit sensor discharge.

8. A gas sensor of claim 7, wherein the treatment method further comprises:
   providing an additional reference Pt electrode deposited inside the reference electrode such that the two electrodes are electrically isolated.

9. A gas sensor of claim 7 wherein the treatment method further comprises:
   permanently connecting the reference electrode lead with a Pt heater lead.

10. A gas sensor of claim 7 wherein the treatment method further comprises:
    d) during the charging of step c, the charging current and charge transfer is measured between the reference electrode and the sensing electrode; and
    e) during discharge phases of the pausing, open circuit discharge is measured between the process electrode and a newly deposited reference electrode.

11. A gas sensor of claim 10, wherein the treatment method further comprises:
    providing an additional reference Pt electrode deposited inside and or in direct vicinity of the reference electrode such that the reference electrode and the newly deposited reference electrode are electrically isolated; and
    providing a measurement electrode separated from the reference electrodes by a layer of ionically conductive material and covering both reference electrodes.

12. A planar gas sensor of claim 11, wherein the treatment method further comprises:
    permanently connecting the reference electrode lead with a Pt heater lead.

13. A planar gas sensor of claim 11, wherein the treatment method further comprises:
    a. measuring the charging phases to determine a differential signal between the measurement electrode and the ground and the reference electrode and the measurement electrode and the electrically isolated newly deposited reference electrode;
    b. establishing a calibration curve relating the differential signal between the measurement electrode and the ground with known applied oxygen concentration;
    c. using this calibration curve for accurate measurements of the oxygen concentration in the analyzed gas;
    d. during the discharge phases measuring an open circuit discharge between the measurement electrode and the reference electrode and between the measurement electrode and the newly deposited reference electrode; and
    e. relating an observed discharge signal with the NOx concentration in an analyzed gas.

14. A gas sensor of claim 1 treated to minimize Na atom diffusion and Pt electrode by a method comprising:
    a) obtaining a power supply with floating positive and negative outputs;
    b) connecting a heater lead with a reference electrode lead and connecting both the heater lead and the reference electrode lead to ground.

* * * * *